United States Patent
Chang et al.

(10) Patent No.: US 12,160,287 B2
(45) Date of Patent: Dec. 3, 2024

(54) ANTENNA ALLOCATION BETWEEN DIFFERENT RADIO ACCESS TECHNOLOGIES

(71) Applicant: MediaTek Inc., Hsinchu (TW)

(72) Inventors: Chiao-Chih Chang, Hsinchu (TW); Che-Li Lin, Hsinchu (TW)

(73) Assignee: MediaTek Inc. (TW)

( * ) Notice: Subject to any disclaimer, the term of this patent is extended or adjusted under 35 U.S.C. 154(b) by 38 days.

(21) Appl. No.: 17/978,501

(22) Filed: Nov. 1, 2022

(65) Prior Publication Data

US 2023/0147527 A1    May 11, 2023

Related U.S. Application Data

(60) Provisional application No. 63/277,215, filed on Nov. 9, 2021.

(51) Int. Cl.
*H04B 7/0413*    (2017.01)
*H04W 24/02*    (2009.01)

(52) U.S. Cl.
CPC .......... *H04B 7/0413* (2013.01); *H04W 24/02* (2013.01)

(58) Field of Classification Search
CPC ........ H04B 7/0413; H04B 1/401; H04B 1/18; H04W 24/02; H04W 36/14
See application file for complete search history.

(56) References Cited

U.S. PATENT DOCUMENTS

| | | |
|---|---|---|
| 2014/0204904 A1 | 7/2014 | Xiang et al. |
| 2014/0241446 A1 | 8/2014 | Zhang et al. |
| 2014/0273884 A1 | 9/2014 | Mantravadi et al. |
| 2016/0380665 A1* | 12/2016 | Lee ........................ H04W 36/14 455/552.1 |
| 2018/0092109 A1 | 3/2018 | Belghoul et al. |
| 2020/0314742 A1 | 10/2020 | Jantzi et al. |
| 2021/0282104 A1 | 9/2021 | Sagar et al. |
| 2021/0392520 A1* | 12/2021 | Li ......................... H04W 24/02 |
| 2022/0217577 A1* | 7/2022 | Pefkianakis ...... H04W 28/0284 |

OTHER PUBLICATIONS

Taiwan Intellectual Property Office, Office Action in Taiwan Patent Application No. 111142515, Mar. 30, 2023.
European Patent Office, European Search Report in European Patent Application No. 22205741.6, Mar. 20, 2023.

* cited by examiner

*Primary Examiner* — Janice N Tieu

(74) *Attorney, Agent, or Firm* — Andy M. Han; Han IP PLLC

(57) ABSTRACT

Solutions pertaining to allocating antennas of a user equipment (UE) between connections using different RATs are proposed. A UE has a first connection to a first network and a second connection to a second network, each connection employing a respective radio access technology (RAT). During operation, the UE may identify a precondition of reconfiguring the connections. For example, the UE may intend to change a multi-input-multi-output (MIMO) setting of the first connection in order to release some antennas that can be allocated to the second connection to relieve a communication bottleneck thereof. Prior to reconfiguring the connections, the UE may communicate its intent to the first network. The UE may not reconfigure the connections until a confirmation is received from the first network.

20 Claims, 8 Drawing Sheets

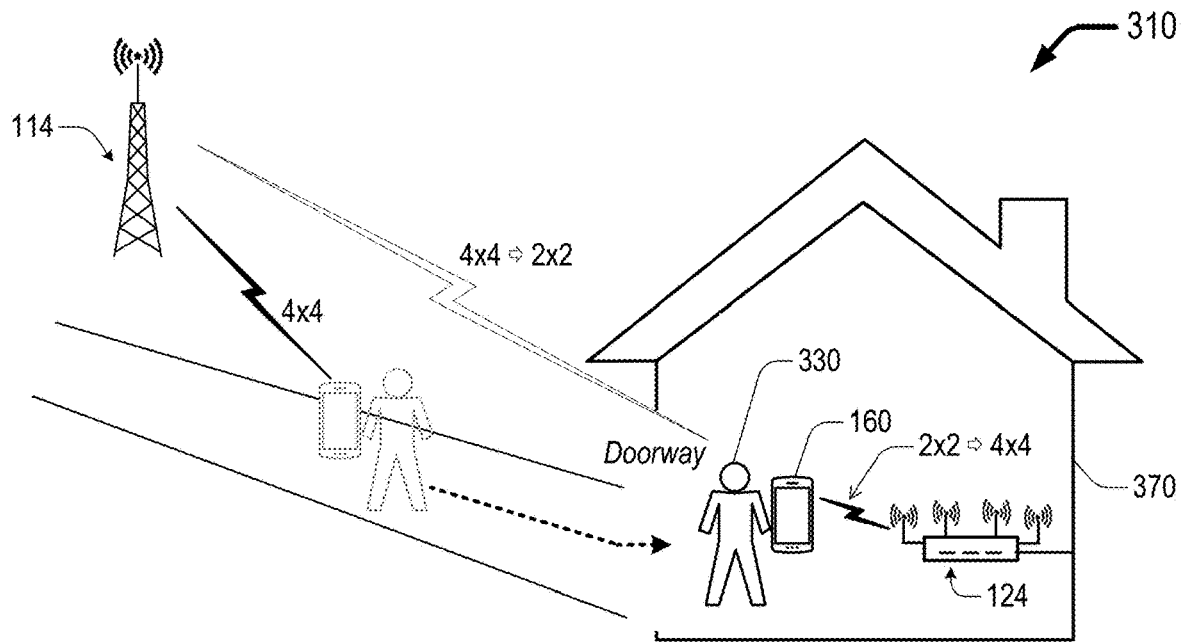
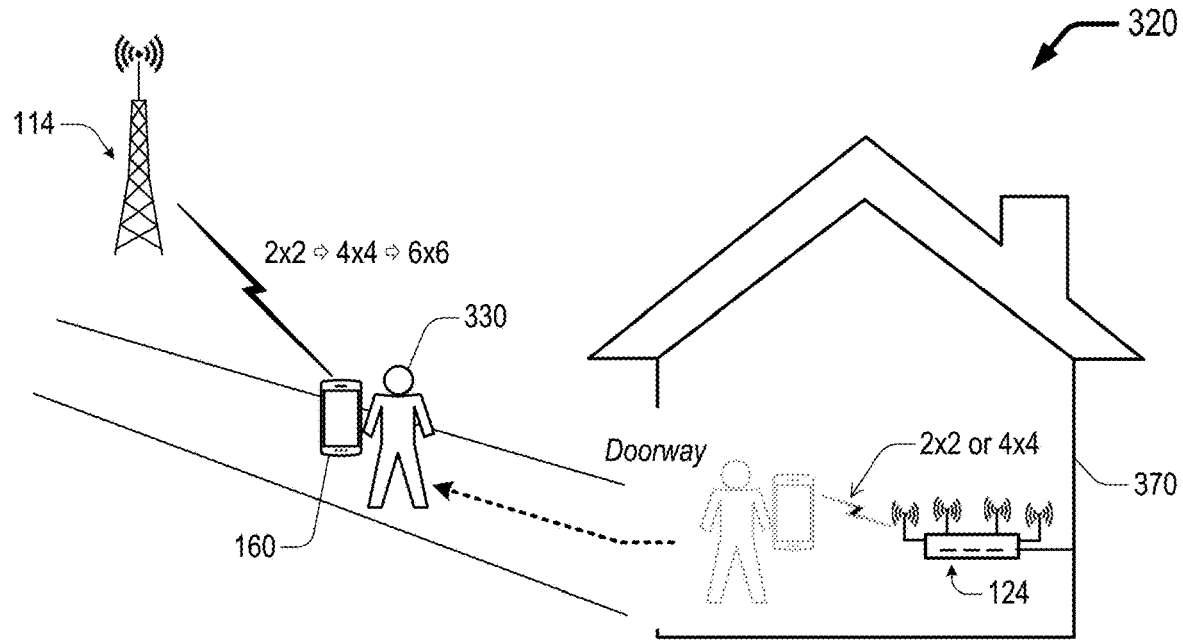
FIG. 3

| Application | Data Rate requirement | Latency Requirement (Uplink latency / Downlink latency) | Suitable WIFI MIMO For Small WIFI RF BW (<=40MHz) | Suitable WIFI MIMO For Large WIFI RF BW (>=80MHz) |
|---|---|---|---|---|
| Off Screen | Low | Not sensitive | 1x1 | 1x1 |
| Messenger | 1 Kbps | Not sensitive | 1x1 | 1x1 |
| Gaming | <1 Mbps | <70~100ms round trip latency | 4x4 | 2x2 |
| Cloud Gaming | ~25 Mbps | <70~100ms round trip latency | 4x4 | 4x4 |
| 240p video conference | <1 Mbps | 100ms round trip latency | 4x4 | 2x2 |
| 720p video streaming | <5 Mbps | Not sensitive | 4x4 | 2x2 |
| 4K video streaming | ~25 Mbps | Not sensitive | 4x4 | 4x4 |

FIG. 5

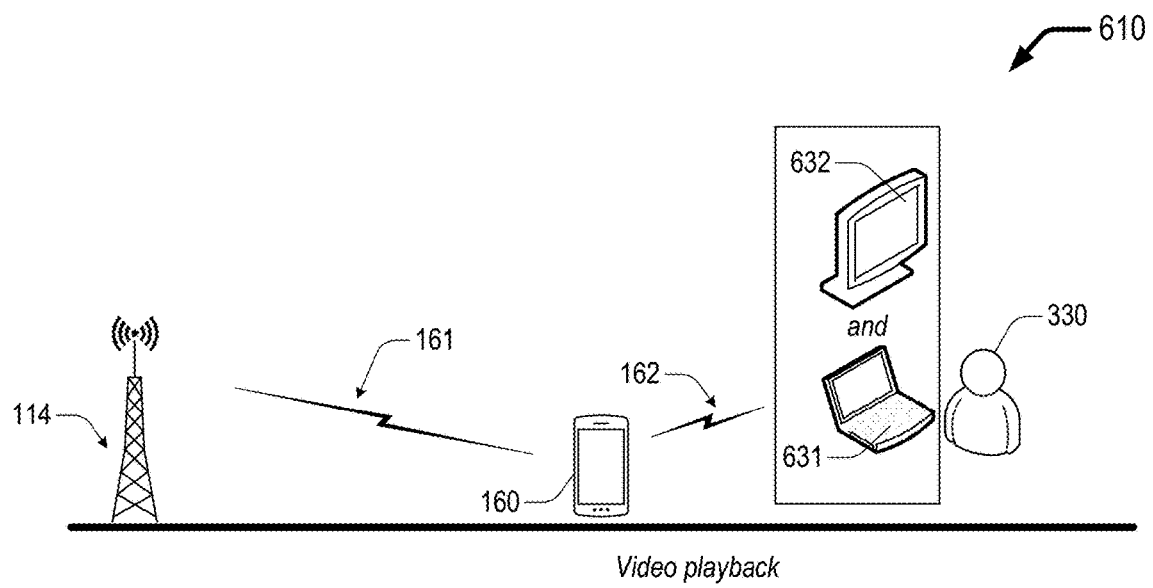
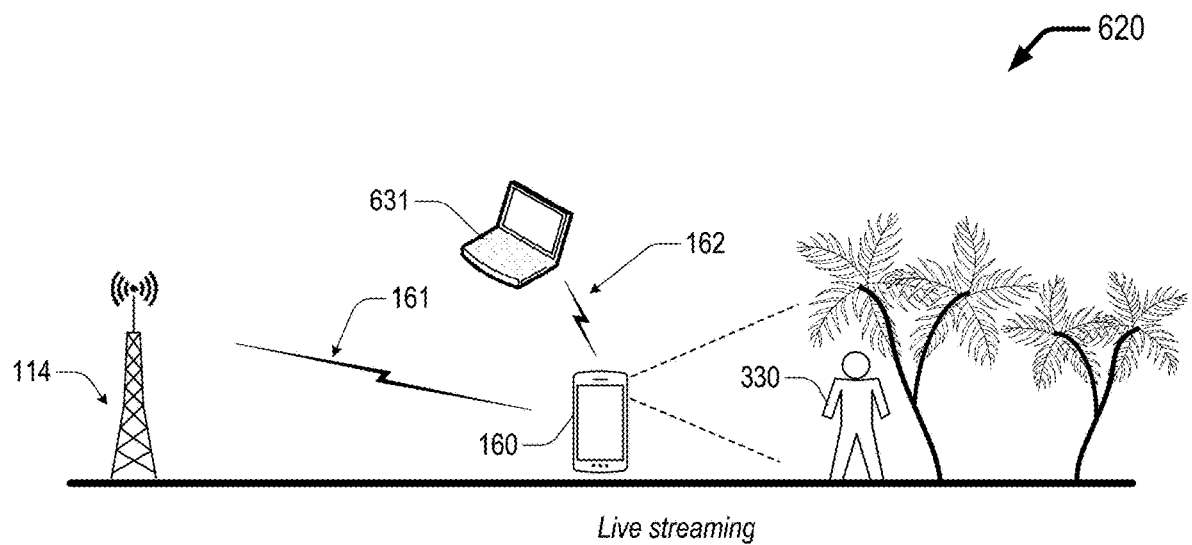
FIG. 6

ANTENNA ALLOCATION BETWEEN DIFFERENT RADIO ACCESS TECHNOLOGIES

CROSS REFERENCE TO RELATED PATENT APPLICATION

The present disclosure is part of a non-provisional patent application claiming the priority benefit of U.S. Provisional Patent Application No. 63/277,215, filed 9 Nov. 2021. The content of aforementioned application is herein incorporated by reference in its entirety.

TECHNICAL FIELD

The present disclosure is generally related to wireless communication, and more particularly, to methods and apparatus for optimizing allocation of antennas between communication services employing different radio access technologies (RATs).

BACKGROUND

Unless otherwise indicated herein, approaches described in this section are not prior art to the claims listed below and are not admitted as prior art by inclusion in this section.

With the norm of multiple antennas being equipped on a user equipment (UE), multiple-input-multiple-output (MIMO) techniques have been widely applied in various wireless communication environments as a prominent feature for enhancing communication reliability, increasing data transmission rate, and/or reducing communication latency. For example, in the year 2009, MIMO is formally included in the Institute of Electrical and Electronics Engineers (IEEE) 802.11n wireless local area network (WLAN) operating standard, with a maximum MIMO number of 4R×4T, or 4×4 (i.e., four individual receivers receiving four spatially encoded streams and four individual transmitters transmitting four spatially encoded streams). Namely, four spatially encoded streams are allowed in a connection link between a UE and a WLAN router or access point. MIMO continues to be a key feature of recent IEEE WLAN standards such as 802.11ac (in 2013) and 802.11ax (in 2021), both supporting a maximum MIMO number of 8×8 (i.e., eight individual receivers receiving eight spatially encoded streams and eight individual transmitters transmitting eight spatially encoded streams).

MIMO has also been adopted by various cellular mobile networks. For example, $4^{th}$ generation (4G) Long-Term Evolution (LTE) networks allow for single-user MIMO (SU-MIMO) connection between a UE and a network base station, whereas 4G LTE-Advanced standard further extends the application to multi-user MIMO (MU-MIMO). In recent releases of the $3^{rd}$ Generation Partnership Project (3GPP) standard for $5^{th}$ Generation (5G)/New Radio (NR) mobile communications, MIMO is taken to the next level, with MIMO techniques supported at a much larger scale for enhanced network performance. The MIMO feature in 5G NR, often referred to as Massive MIMO, has been defined to support MIMO numbers of 32×32, 64×64, and beyond.

In general, each spatial stream of a MIMO scheme demands at least one dedicated physical antenna for the spatial stream to be received and/or transmitted. While it may not be difficult for a base station to incorporate or otherwise be equipped with as many antennas as demanded by the MIMO-based communication services intended to be provided by the base station, there is generally an upper limit on the quantity of antennas a UE is able to bear. This is because each antenna takes up some precious real estate of the UE, whereas the UE is often a cellular phone or another handheld or wearable mobile device having a certain physical size. Namely, in practical communication applications, the maximum MIMO number is often dictated or otherwise limited by the number of antennas equipped on a UE, rather than by the maximum MIMO number defined in or otherwise allowed by various communication standards. For example, a cell phone, given its limited physical size, may only be equipped with four modem antennas for communicating with a base station of a cellular network, as well as two Wi-Fi antennas for communicating with a WLAN access point. With the number of the modem antennas on the UE being four, the maximum MIMO number of a cellular communication link between the cell phone and the base station is limited to 4 (i.e., using a 4×4 MIMO scheme), even if the cellular network is a 5G NR network which is capable of providing better quality for the communication link by performing 6×6, 8×8 or 32×32 MIMO communications. Likewise, with the number of the Wi-Fi antennas on the UE being two, the maximum MIMO number of a Wi-Fi communication link between the cell phone and the WLAN access point is limited to 2 (i.e., using a 2×2 MIMO scheme), regardless the WLAN access point may be operating according to the 802.11ax standard and is capable of performing 8×8 MIMO communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues or limitations. More specifically, various schemes proposed in the present disclosure pertain to enhancing communication performance by properly allocating antennas between connections using different RATs.

In one aspect, a method is provided which is implementable in a UE that has a first connection to a first network and a second connection to a second network. The first and second connections employ a first RAT and second RAT, respectively. The method may involve the UE detecting a precondition of changing a first MIMO setting of the first connection. The method may also involve the UE communicating to the first network an intent to change the first MIMO setting of the first connection. The method may also involve the UE reconfiguring the first connection by changing the first MIMO setting responsive to the detecting. The method may further involve reconfiguring the second connection corresponding to the reconfiguring of the first connection.

In another aspect, an apparatus may include a first transceiver that is configured to establish a first connection to a first network using a first RAT. The apparatus may additionally include a second transceiver configured to establish a second connection to a second network using a second RAT. The apparatus may further include a processor that is configured to detect a precondition of changing a first MIMO setting of the first connection. The processor may also be configured to communicate to the first network, via the first transceiver, an intent to change the first MIMO setting of the first connection. The processor may further be configured to reconfigure the first connection and the second connection according to the intent. Specifically, responsive to the detecting of the precondition, the apparatus may reconfigure the first connection by changing the first MIMO setting, and subsequently reconfigure the second connection corresponding to the reconfiguring of the first connection. The apparatus may also include a plurality of antennas, which may be divided into a first group and a second group. The one or more antennas of the first group are configured to engage with the first transceiver to service the first connection, whereas the one or more antennas of the second group are configured to engage with the second transceiver to service the second connection.

It is noteworthy that, although description provided herein may be in the context of certain radio access technologies, networks and network topologies such as Wi-Fi or 5G NR, the proposed concepts, schemes and any variation(s)/derivative(s) thereof may be implemented in, for and by other types of radio access technologies, networks and network topologies such as, for example and without limitation, Bluetooth, Bluetooth Low Energy (BLE), ZigBee, infrared, Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram of two example schemes in accordance with an implementation of the present disclosure.

FIG. 5 is a table showing communication requirements corresponding suitable MIMO settings for various applications.

FIG. 6 is a diagram of two example schemes in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimizing allocation of antennas of a user equipment (UE) between various communication services employing different radio access technologies (RATs). According to the present disclosure, a number of possible solutions may be implemented separately or jointly. That is, although these possible solutions may be described below separately, two or more of these possible solutions may be implemented in one combination or another.

A UE, which is a portable, mobile or wearable apparatus such as a smartphone, typically employs various wireless communication and computing functions. For example, a smartphone is usually capable of performing several wireless communication operations simultaneously, each through a respective RAT, such as 4G LTE, 5G NR, Bluetooth, Wi-Fi, Global Positioning System (GPS), near-field communication (NFC), millimeter wave (mmWave), etc. Moreover, many of the RATs support multiple-input-multiple-output (MIMO) techniques, with each wireless connection link comprising multiple spatial streams each following a respective propagation path when traveling in free space between a transmitter of the UE and a remote receiver, also between a remote transmitter and a receiver of the UE. For each spatial stream, the UE is required to dedicate at least one respective antenna for transmitting and receiving radio signals.

As alluded to elsewhere herein above, although various wireless communication standards support a high MIMO number, i.e., the number of spatial streams employed in MIMO schemes, the actual usage of the MIMO schemes is often limited by the number of antennas equipped in a UE. With the number of antennas limited to a quantity due to the practical physical size of the UE, the benefit that could have been resulted with a higher number of MIMO streams is often compromised.

Figure 1:
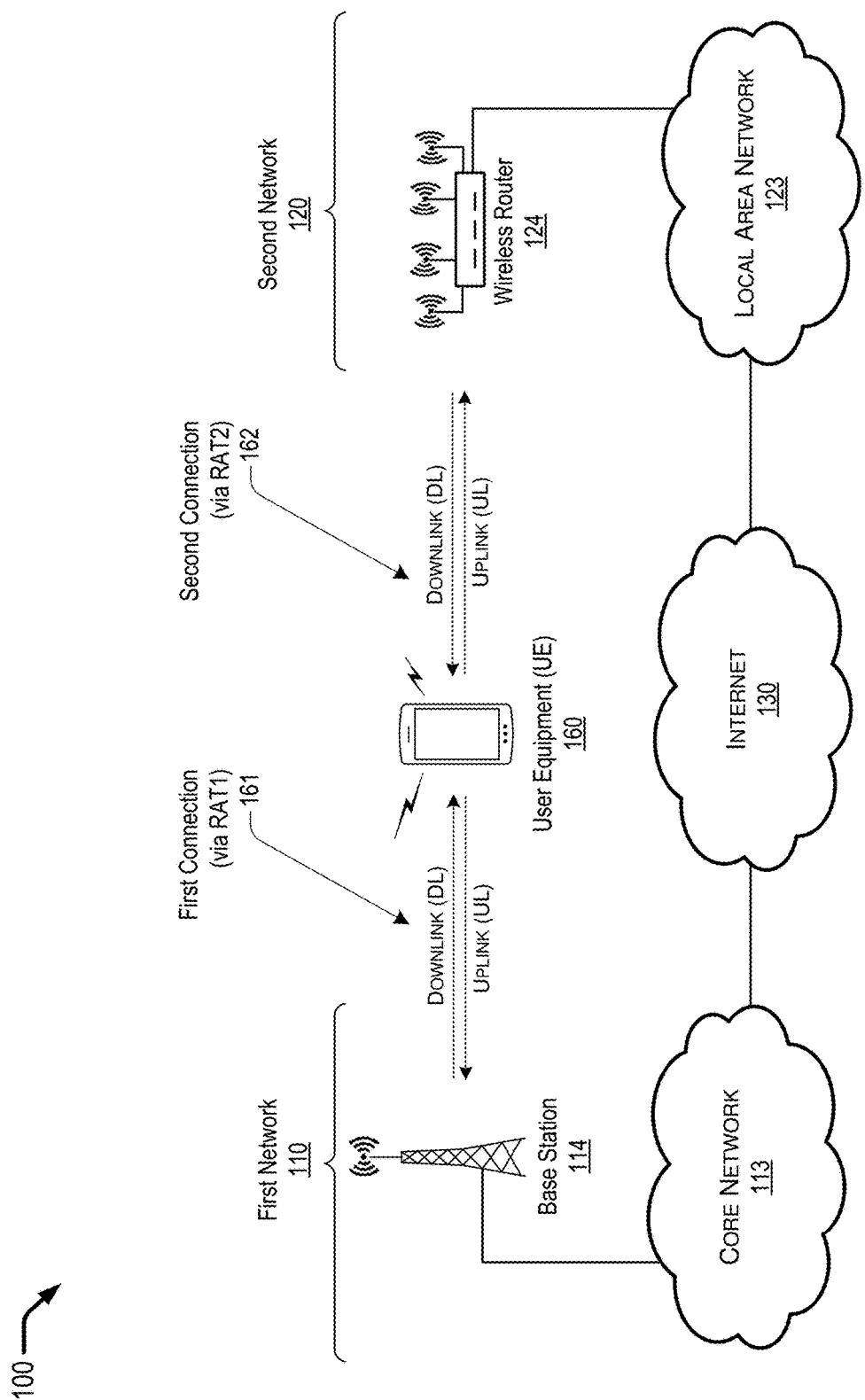
FIG. 1 is a diagram of an example network environment in which various proposed schemes in accordance with the present disclosure may be implemented.

FIG. 1 is a diagram of an example network environment 100 in which various solutions and schemes in accordance with the present disclosure may be implemented. FIG. 2~FIG. 8 illustrate examples of implementation of various proposed schemes in the network environment 100 in accordance with the present disclosure. The following description of various proposed schemes is provided with reference to FIG. 1~FIG. 8.

Referring to FIG. 1, network environment 100 may involve a UE 160 having a wireless connection 161 (herein interchangeably referred to as "first connection") to a network 110 (herein interchangeably referred to as "first network"). Additionally, the UE 160 also has a wireless connection 162 (herein interchangeably referred to as "second connection") to a network 120 (herein interchangeably referred to as "second network"). Each of the first connection 161 and the second connection 162 is realized via a respective RAT. For example, the UE 160 may be a smartphone, the first network 110 may be a cellular network or another type of wide area network (WAN), and the second network 120 may be a wireless local area network (WLAN). Each of the first network 110 and the second network 120 may be connected to the Internet 130.

As shown in FIG. 1, the first connection 161 is established between the UE 160 and a base station 114 of the first network 110, whereas the base station 114 is connected to a core network 113 of the first network 110. In an event that the base station 114 is an eNodeB of an LTE, LTE-Advanced or LTE-Advanced Pro network, the first connection 161 may be established via a RAT of 4G LTE (herein interchangeably referred to as "RAT1"). In an event that the base station 114 is a gNB or transmit-receive point (TRP) of a 5G NR network, the first connection 161 may be established via a RAT of 5G NR. Likewise, the second connection 162 is established between the UE 160 and an access point or wireless router 124 of the second network 120, whereas the wireless router 124 is connected to a local area network (LAN) 123 of the second network 120. In an event that the wireless router 124 employs an IEEE 802.11 Wi-Fi standard (e.g., IEEE 802.11ax), the second connection 162 may be established via a RAT of the IEEE 802.11 standard(s) (herein interchangeably referred to as "RAT2").

Figure 2:
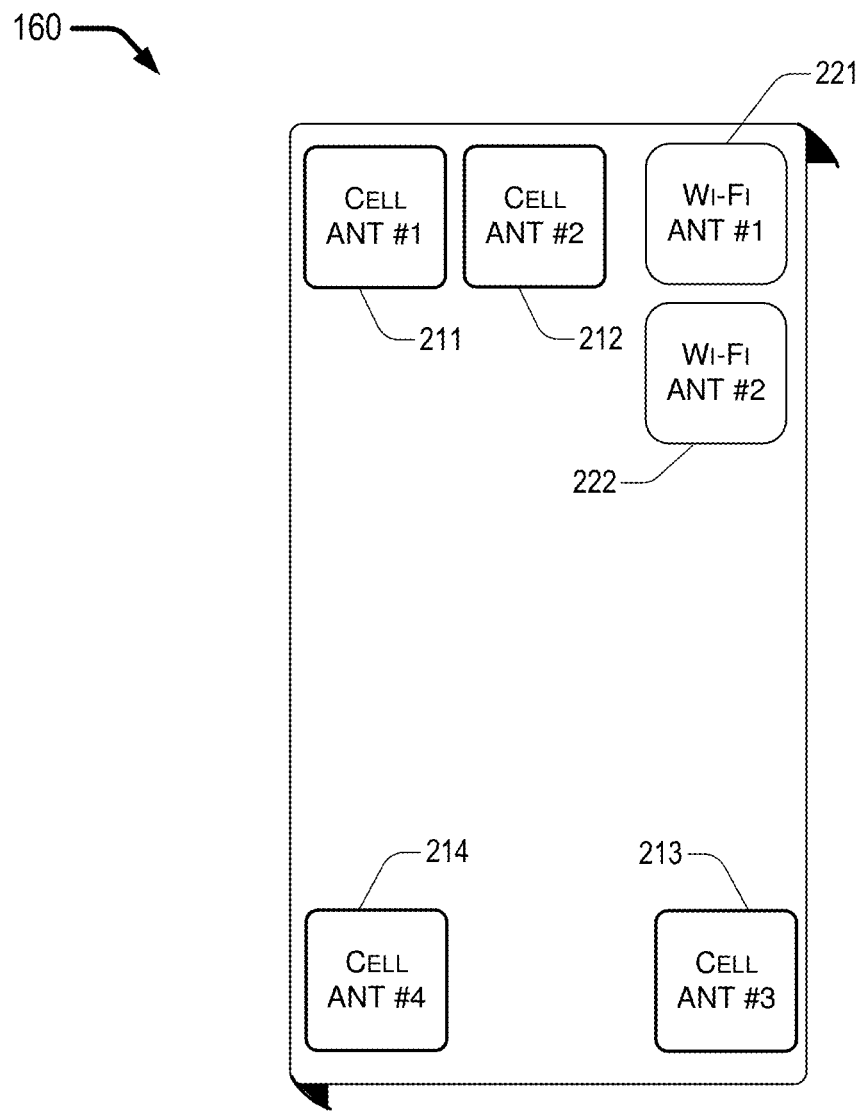
FIG. 2 is a diagram illustrating various antennas of an example user equipment in accordance with an implementation of the present disclosure.

Each of the first connection 161 and the second connection 162 may include a downlink (DL) that originates from the base station 114 or the wireless router 124 and ends at the UE 160, as well as an uplink (UL) that originates from the UE 160 and ends at the base station 114 or the wireless router 124. Moreover, each of RAT1 and RAT2 may support various MIMO techniques, and each of the first connection 161 and the second connection 162 may thus have two or more spatial streams. The UE 160 is required to dedicate at least one antenna for each of the spatial streams. The UE 160 may include a plurality of antennas for performing various wireless communication functions using different RATs. FIG. 2 is an example illustration of the UE 160, which shows some of the plurality of antennas equipped in the UE 160. As shown in FIG. 2, the antennas equipped in the UE 160 include cellular or modem antennas 211, 212, 213 and 214, as well as Wi-Fi antennas 221 and 222. When operating in the network environment 100, the cellular antennas 211-214 may be used for MIMO-based communications through the first connection 161, whereas the Wi-Fi antennas 221 and 222 may be used for MIMO-based communications through the second connection 162. The antennas, as shown in FIG. 2, are often equipped at edge or end regions the UE 160 so that the transmitting and receiving of radio signals via the antennas are less likely impeded by other computing, displaying or data processing activities simultaneously performed by the UE 160.

FIG. 3 illustrates a proposed scheme 310 in accordance with the present disclosure, wherein a user 330 carrying the UE 160 is moving from an outdoor environment to an indoor environment. When the user 330 is outdoor, the UE 160 may perform wireless communication functions mainly via the first connection 161 established between the UE 160 and the base station 114. The first connection 161 may employ a 4×4 MIMO scheme using the cellular antennas 211-214 of the UE 160. Meanwhile, little wireless communication might be realized via Wi-Fi connections when the user 330 is outdoor and far away from any Wi-Fi access point, such as the wireless router 124 fixedly located inside the house 370. That is, the UE 160 may receive, via the Wi-Fi antennas 221 and 222, very weak Wi-Fi signals transmitted from the wireless router 124 when located outdoors.

As the user 330, carrying the UE 160, is moving closer to, and even inside, the house 370, the Wi-Fi signals from the wireless router 124 that are received by the Wi-Fi antennas 221 and 222 may become stronger (i.e., having a higher intensity), as the UE 160 is within a closer proximity to the wireless router 124. Meanwhile, the radio signals of the first connection 161 received by the UE 160 may become weaker (i.e., having a lower intensity) due to the UE 160 having moved indoors. The UE 160 may detect that the wireless router 124 is available as a better target for data connection, and subsequently establish the second connection 162 to the wireless router 124. The UE 160 may further detect that the wireless router 124 is capable of performing Wi-Fi communications having a MIMO number of 2, 4, 6 or 8 (i.e., employing 2×2, 4×4, 6×6 or 8×8 MIMO schemes). However, given that the UE 160 has only two Wi-Fi antennas 221 and 222, the UE 160 may establish the second connection 162 using only a MIMO number of 2 (i.e., with a 2×2 MIMO scheme).

In some embodiments, the UE 160 may increase the MIMO number beyond the quantity of Wi-Fi antennas equipped thereon by using one or more of the cellular antennas 211-214 for MIMO-based communication with the wireless router 124, especially when the first connection 161 and the second connection 162 operate in frequency bands that are close to one another. (For instance, 4G LTE, 5G NR and IEEE 802.11b/g/n/ax all use frequency bands in the range of 2.3-2.5 GHz; both 4G LTE and IEEE 802.11j use frequency bands in the range of 4.9-5.2 GHz.) Specifically, UE 160 may reconfigure the first connection 161 by reducing the MIMO number thereof, thereby releasing some of the cellular antennas 211-214 from transmitting and/or receiving radio signals of the first connection 161. The UE 160 may subsequently reconfigure the second connection 162 by additionally using the released cellular antenna(s) in the second connection 162 to realize MIMO-based communications at a higher MIMO number.

For instance, when the user 330 is outdoor, the first connection 161 may have a MIMO number of 4, and all four cellular antennas 211-214 may be employed. As the user 330 and the UE 160 move indoor, the UE 160 may detect the existence of the wireless router 124 and connect to the wireless router 124 with the second connection 162 using a default MIMO scheme. The default MIMO scheme may be a 2×2 MIMO scheme, as the UE 160 is equipped with two Wi-Fi antennas, i.e., the Wi-Fi antennas 221 and 222. The UE 160 may further detect the 4×4, 6×6 and 8×8 MIMO features that the wireless router 124 is capable of operating with. In order to increase the MIMO number of the second connection 162 beyond 2, the UE 160 may intend to change the MIMO setting of the first connection 161 from a MIMO number of 4 to a MIMO number of 2, so that two of the cellular antennas 211-214 may be released from the first connection 161. The UE 160 may communicate the intent to the first network 110 by sending to the base station 114 a request of reducing the MIMO number of the first connection 161 from 4 to 2. The request may be sent in a form of UE assistance information (UAI) via the uplink of the first connection 161. The UAI is specific to the UE 160 and may additionally include other communication assistance information pertinent to the first connection 161. After sending the request to the base station 114, the UE 160 may proceed to reconfigure the first connection 161 from a 4×4 MIMO scheme to a 2×2 MIMO scheme. As a result, two of the cellular antennas 211-214, e.g., the cellular antennas 213 and 214, are released from the operation of the first connection 161. The UE 160 may correspondingly reconfigure the second connection 162 from a 2×2 MIMO scheme to a 4×4 MIMO scheme, which includes four spatial streams transmitted and received by the Wi-Fi antenna 221, the Wi-Fi antenna 222, the cellular antenna 213 and the cellular antenna 214, respectively. As a result, the quality (e.g., data rate and/or latency) of the second connection 162 may be improved beyond what was resulted with the 2×2 MIMO scheme, because MIMO schemes with a MIMO number of 4 is now implemented in the second connection 162 with the addition of the released cellular antennas 213 and 214.

The UE 160 may use a similar method to further increase the MIMO number of the second connection 162. For example, the UE 160 may send a separate request to the base station 114 to further reduce the MIMO number of the first connection 161 from 2 to 1, thereby releasing one more cellular antenna (e.g., the cellular antenna 212) from the first connection 161. The UE 160 may further disable its Bluetooth (BT) function such that a BT antenna equipped in the UE 160 (not shown in FIG. 2) may also be made available for the second connection 162. With the BT antenna and the cellular antenna 212 available, the UE 160 may then reconfigure the second connection 162 to a 6×6 MIMO scheme, which includes six spatial streams transmitted and received by the Wi-Fi antennas 221 and 222, the cellular antennas 212-214, and the BT antenna, respectively.

In some embodiments, in addition to sending to the base station 114 the request of reducing the MIMO number of the first connection 161, the UE 160 may, after sending the request and before reconfiguring the first connection 161, further receive a confirmation from the base station 114 acknowledging or otherwise indicating that the request has been granted. Namely, by sending the confirmation, the base station 114 notifies the UE 160 that the first connection has been reconfigured on the base station 114's end using a MIMO scheme of a reduced MIMO number as requested. The confirmation may be received via the downlink of the first connection 161. Upon receiving the confirmation, the UE 160 may then reconfigure the first connection 161 to a lower MIMO number. Namely, both the UE 160 and the base station 141 partake in the reconfiguration of the first connection 161 through the handshaking procedure. The handshaking procedure is beneficial, and thus preferred, as opposed to the UE 160 single-handedly lower the MIMO number setting without notifying the base station 114, because with the handshaking procedure both ends of the first connection 161 are in sync regarding the MIMO number reduction that is taking place, thereby avoiding the UE 160 missing packets transmitted in the downlink of the first connection 161, or at least keeping the missed packets to a minimum.

In some embodiments, the UE 160 may reconfigure the first connection 161 after sending the request to the base station 114 but not necessarily after receiving the confirmation from the base station 114. In some other embodiments, the UE 160 may reconfigure the first connection 161 even prior to sending the request to the base station 114 and receiving the confirmation from the base station 114. In either case, the UE 160 may have reconfigured the first connection 161 prior to the base station 114 reconfigures the first connection 161. As long as the UE 160 receives the confirmation from the base station 114 within a reasonably short period of time after the UE 160 reconfigures the first connection 161, the number of lost packets, if any, would be kept relatively small and cause little degradation in the communication performance.

Also illustrated in FIG. 3 is a proposed scheme 320 in accordance with the present disclosure, wherein a user 330 carrying the UE 160 is moving from an indoor environment to an outdoor environment. The scheme 320 may follow the scheme 310 in terms of a sequence in time. When the user 330 is indoor, the UE 160 may perform communication functions (e.g., connecting to the Internet 130) mainly via the second connection 162 established between the UE 160 and the wireless router 124 located inside the house 370. The second connection 162 may employ a 2×2 MIMO scheme using the Wi-Fi antennas 221 and 222 of the UE 160. In some embodiments, the second connection 162 may employ a 4×4 MIMO scheme using the Wi-Fi antennas 221 and 222 as well as the cellular antennas 213 and 214, as described elsewhere herein above and pertinent to the scheme 310. Meanwhile, while located indoor, the UE 160 may maintain the first connection 161 using possibly a lower MIMO setting such as a 2×2 MIMO scheme.

Referring to the scheme 320, as the UE 160 moves with the user 330 from inside to the outside of the house 370, the UE 160 may detect that the radio signal from the base station 114 as received is becoming stronger, and the Wi-Fi signals from the wireless router 124 as received is becoming weaker. The UE 160 may determine that a MIMO scheme higher than 2×2 would be beneficial to enhance the communication quality of the first connection 161. For instance, the UE 160 may thus have an intent to restore the MIMO setting of the first connection 161 from 2×2 back to 4×4. The UE 160 may communicate the intent to the first network 110 by sending to the base station 114 a request of increasing the MIMO number of the first connection 161 from 2 to 4. The request may be sent in a form of UAI specific to the UE 160 via the uplink of the first connection 161. The UE 160 may also reconfigure the second connection 162 from a 4×4 MIMO scheme to a 2×2 MIMO scheme so that the cellular antennas 213 and 214 that had been lent to the MIMO operation of the second connection 162, as described above with the scheme 310, are released and made available again for the first connection 161. After sending the request to the base station 114, the UE 160 may proceed to reconfigure the first connection 161 from a 2×2 MIMO scheme to a 4×4 MIMO scheme, employing all of the cellular antennas 211-214.

In some embodiments, up detecting certain precondition regarding the first connection 161 or the second connection 162, the UE 160 may have an intent to further increase the MIMO number of the first connection 161 beyond the quantity of the cellular antennas equipped in the UE 160. For instance, the user 330, while being outside the house 370, may start to download a lengthy movie in ultra-high definition (UHD) resolution for later offline viewing. The download of the UHD movie demands a high transmission bandwidth in the downlink of the first connection 161, which is not readily attainable by the 4×4 MIMO scheme currently employed by the first connection 161. Specifically, the UE 160 may start by downloading the UHD movie via the first connection 161 using a 4×4 MIMO scheme, while monitoring the transmission speed of the downlink of the first connection 161. The UE 160 may then determine that a transmission bottleneck in the first connection 161 has occurred by observing that the transmission speed of the downlink has been constantly below a predetermined threshold specific to downloading a UHD movie for a predetermined period of time. Accordingly, the UE 160 may have an intent to change the MIMO setting of the first connection 161 to a higher MIMO number, e.g., a 6×6 MIMO scheme. To this end, the UE 160 may reconfigure the second connection 162 by disabling the second connection 162 completely, thereby freeing up the Wi-Fi antenna 221 and 222.

The UE 160 may then communicate to the base station 114 the intent regarding employing the 6×6 MIMO scheme. Specifically, the UE 160 may send to the base station 114 a request of changing the MIMO number for the first connection 161 to 6, followed by receiving a reconfirmation from the base station 114 indicating the request has been granted. Upon receiving the confirmation, the UE 160 may increase the MIMO number of the first connection 161 from 4 to 6. The 6×6 MIMO scheme may thus be realized by using the cellular antennas 211-214 in conjunction with the Wi-Fi antenna 221 and 222 that are released from the termination of the second connection 162, i.e., from disabling the Wi-Fi connection function of the UE 160.

In some embodiments, the UE 160 may detect a transmission bottleneck resulted not from an insufficient number of spatial streams, but from a poor radio signal as received by the UE 160. The poor radio signal may be manifested in a poor signal-to-noise ratio (SNR) possibly due to severe multipath propagation issues that happen to exist in the outdoor environment where the UE 160 is located. Accordingly, the UE 160 may have a intent to change the MIMO setting of the first connection 161 not by increasing the MIMO number thereof, but by increasing a quantity of antennas employed for transmitting and/or receiving at least one spatial stream of the first connection 161. Specifically, the UE 160 may additionally employ either or both of the Wi-Fi antenna 221 and 222, which are released from the UE 160's termination of the second connection 162, for one or more spatial streams of the first connection 161. The additional antenna(s) may be used in conjunction of the cellular antennas 211-214 for improving the SNR of the spatial stream(s) using beamforming or maximum ratio combining (MRC) techniques.

Figure 4:
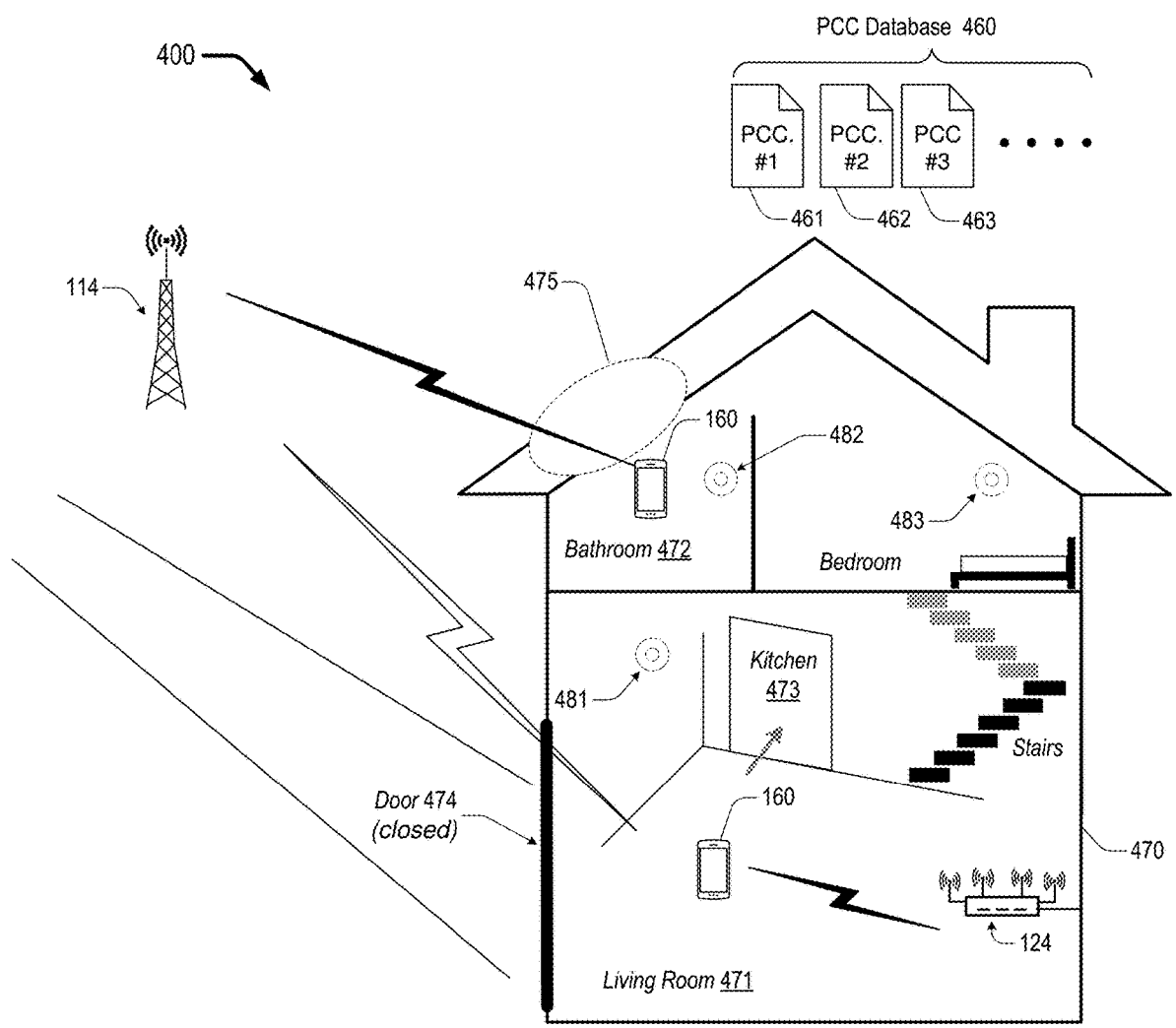
FIG. 4 is a diagram of an example scheme in accordance with an implementation of the present disclosure.

FIG. 4 illustrates a proposed scheme 400 in accordance with the present disclosure, wherein the UE 160 may have an intent to change MIMO settings of the first connection 161 and/or the second connection 162 based on a geolocation of the UE 160. As shown in FIG. 4, a house 470 has several rooms, including a living room 471, a bathroom 472, a kitchen 473, and a bedroom. Based on the location at which the UE 160 is located in the house 470, a corresponding preferred connection configuration (PCC) or profile may be applied to the first connection 161 and/or the second connection 162. Namely, the PCC is specific to the geolocation of the UE 160, or to a combination of the UE 160 and the geolocation. The PCC governs connection parameters of the first connection 161 and/or the second connection 162, including various MIMO settings thereof. The PCC is intended to achieve an optimized, best-in-history, or otherwise satisfactory communication performance of the first connection 161 and the second connection 162. The UE 160 may include a PCC database 460, wherein various PCCs (e.g., PCCs 461, 462 and 463) are stored. When the UE 160 is located within the living room 471, the UE 160 may intend to apply the PCC 461 for the first connection 161 and the second connection 162. Likewise, when the UE 160 is located in the bathroom 472, the UE 160 may intend to apply the PCC 462, whereas when the UE 160 is located in the kitchen 473, the UE 160 may intend to apply the PCC 463.

The PCCs are specific to the geolocation of the UE 160 mainly because each geolocation may have a respectively different wireless communication environment. As shown in FIG. 4, the wireless router 124 is located in the living room 471, and thus the PCC 461 may allocate most wireless communication resources of the UE 160, such as a majority of various antennas of the UE 160, to be used for the second connection 162, especially if an entrance door 474 to the living room 471 is closed. On the other hand, the bathroom 472 is located in an upper level of the house 470, not in the same level as the wireless router 124. While being farther away from the wireless router 124, the bathroom 472 has a skylight window 475, through which the UE 160 has strong radio reception from the base station 114. Therefore, the PCC 462 may allocate most wireless communication resources of the UE 160, such as a majority of various antennas of the UE 160, to be used for the first connection 161. For example, the PCC 462 may configure the MIMO setting of the first connection 161 to employ a 4×4 MIMO scheme, especially when the user 330 intend to operate a task or application on the UE 160 that demands a high-speed transmission for the first connection 161, e.g., to watch a high-definition movie while using the bathroom 472. As for the kitchen 473, being located in the back of the house 470, the kitchen 473 has poor reception for both the radio signal from the base station 114 and the radio signal from the wireless router 124. In an event that the UE 160 is located in the kitchen 473, the PCC 463 may be applied, which may allocate most wireless communication resources of the UE 160 to be used for the second connection 162, but in a way different from how the PCC 461 governs the first connection 161 and the second connection 162. For instance, the PCC 463 may configure the MIMO setting of the first connection 161 to employ a 2×2 MIMO scheme using the cellular antennas 211 and 212, thereby freeing up the other two cellular antennas of the UE 160, i.e., the cellular antennas 213 and 214. In addition, the PCC 463 may further configure the MIMO setting of the second connection 162 to employ a 2×2 MIMO scheme with beam forming. The PCC 463 may configure the UE 160 to employ the Wi-Fi antennas 221 and 222 in conjunction with the cellular antennas 213 and 214 for the beamforming towards the wireless router 124 located in the living room 471. The beamforming may thus improve the reception of the radio signal transmitted from the wireless router 124.

In some embodiments, the geolocation of the UE 160 may be determined by a positioning system, such as a GPS, or a meshed system comprising a plurality of sensors deployed in various locations. For example, a plurality of indoor sensors, transmitters, or beacons, such as beacons 481, 482 and 483, may be deployed at various locations of the house 470. The UE 160 may determine its own geolocation by communicating with the indoor beacons, likely through lower-power RATs such as NFC.

In some embodiments, each of the PCCs stored in the PCC database 460 may be a historical connection configuration, i.e., a connection configuration that has been employed in the past by the UE 160 at the corresponding geolocation. A PCC may be determined or otherwise updated by the UE 160 examining various historical connection configurations, as well as the associated communication performance, that have been employed at the corresponding geolocation. The UE 160 may designate as the PCC a historical configuration that resulted in a satisfactory, or even the best, communication performance in the past. The UE 160 may retrieve the PCC from the PCC database 460 every time the UE 160 is at or near the corresponding geolocation. The UE 160 may compare the PCC and the current connection configuration and, in an event that there is a difference between the two, initiate an intent to change a MIMO setting of the first connection 161 and/or a MIMO setting of the second connection 162.

In some embodiments, the PCCs stored in the PCC database 460 of the UE 160 may also depend on the application(s) being performed by the UE 160. Specifically, different applications may impose different requirements in determining the corresponding PCC in terms of various key performance indices (KPIs) such as communication latency and data transmission rate. The table 500 of FIG. 5 demonstrates example preferred MIMO settings as the UE 160 operates different applications. As shown in the table 500, the preferred MIMO setting varies depending on the application the UE 160 is intended to perform. Moreover, the preferred MIMO setting is also dependent on the radio frequency bandwidth (RF BW) of the second connection 162, as different IEEE 802.11 standards may have different RF BW values.

FIG. 6 illustrates a proposed scheme 610 and a proposed scheme 620 in accordance with the present disclosure. The scheme 620 may follow the scheme 610 in terms of a sequence in time. In each of the proposed schemes 610 and 620, the UE 160 is performing Wi-Fi tethering. That is, a laptop computer 631 is connected to the Internet 130 via a combination of the first connection 161 and the second connection 162, wherein the UE 160 serves as a Wi-Fi hotspot. Specifically, the laptop computer 631 is connected to the UE 160 via the second connection 162 using RAT2 (e.g., IEEE 802.11ax), whereas the UE 160 is connected to the Internet 130 by firstly connecting to the base station 114 via the first connection 161 using RAT1 (e.g., 5G NR). Moreover, the UE 160 is also connected to a wireless monitor 632 via the second connection 162. By default, the UE 160 may allocate antennas to the first connection 161 and second connection 162 based on the quantities of the different types of antennas equipped in the UE 160. That is, the UE 160 may follow a default setting and allocate the cellular antennas 211-214 to service the first connection 161, whereas the UE 160 may allocate the Wi-Fi antennas 221 and 222 to service the second connection 162.

In the scheme 610, the user 330 may be typing up a reporting email on the laptop computer 631 in a park, whereas the email is regarding a sport event that was conducted a few days ago. Meanwhile, for writing the reporting email, the user 330 is playing back several video clips of the tryout event, previously recorded and stored in the UE 160, by streaming the video clips to the wireless monitor 632. While the UE 160 performs these tasks, the UE 160 may observe transmission data buffers (e.g., the uplink data buffers) of the first and second connections 161 and 162 to monitor whether a transmission bottleneck has occurred in either connection. For instance, the UE 160 may observe that the amount of un-streamed data accumulated in the uplink data buffer of the second connection 162 has been increasing, or that the uplink data buffer of the second connection 162 has been full, either of which may be an indication that a transmission bottleneck has occurred in the second connection 162. The UE 163 may thus intend to change a MIMO setting of the first connection 161 as well as a MIMO setting of the second connection 162. For instance, the UE 160 may have an intent to decrease the MIMO number of the first connection 161, as well as a need to increase the MIMO number of the second connection 162. The UE 160 may communicate the intent to the base station 114 by sending a request of reducing the MIMO number for the first connection 161 from 4 to 2. Upon receiving a confirmation from the base station 114 indicating that the request has been granted, the UE 160 may reconfigure the first connection 161 accordingly, thereby releasing two cellular antennas. The UE 160 may subsequently reconfigure the second connection 162 by increasing the MIMO number thereof from 2 to 4 using the two cellular antennas in conjunction with the two Wi-Fi antennas of the UE 160.

In the scheme 620, the user 330 may have finished writing the reporting email and sent out the reporting email to a recipient via the Internet 130. The wireless monitor 632 has been disconnected from the UE 160 and turned off, whereas the laptop 631 remains connected to the UE 160 for receiving a returning email. Meanwhile, the user 330 starts a live streaming session, which greatly increases transmission requirements of the first connection 161 especially regarding the uplink thereof. As a result, while monitoring the transmission data buffers of the first and second connections 161 and 162, the UE 160 may observe an increase in the amount of un-streamed data accumulated in the transmission data buffer of the first connection 161, or that the transmission buffer has been full, either of which may be an indication that a transmission bottleneck has occurred in the first connection 161. The UE 163 may thus intend to change a MIMO setting of the first connection 161 as well as a MIMO setting of the second connection 162. For instance, the UE 160 may have an intent to increase the MIMO number of the first connection 161, as well as an intent to decrease the MIMO number of the second connection 162. Accordingly, the UE 160 may communicate the intent to the base station 114 by sending a request of increasing the MIMO number for the first connection 161 from 2 to 4. Meanwhile, the UE 160 may reconfigure the second connection 162 by decreasing the MIMO number thereof from 4 to 2, thereby freeing up the two cellular antennas that was borrowed from the first connection 161 previously in the scheme 610. Upon receiving a confirmation from the base station 114 indicating that the request has been granted, the UE 160 may subsequently reconfigure the first connection 161 by changing the MIMO setting from using a 2×2 MIMO scheme to a 4×4 MIMO scheme, which may employ all four cellular antennas of the UE 160.

In addition to monitoring the transmission data buffers (i.e., as described above pertinent to the schemes 610 and 620) or the transmission speed (i.e., as described above pertinent to the scheme 320) for detecting an occurrence of a transmission bottleneck, the UE 160 may use other methods to identify or otherwise detect a potential transmission bottleneck, so that the UE 160 may reconfigure the first connection 161 and/or the second connection 162 accordingly. For example, before the actual transmission of data, the UE 160 may perform a speed test for each of the first connection 161 and the second connection 162. A lower-than-expected speed test value may be an indication of a potential bottleneck. As another example, the UE 160 may constantly perform a latency test for each of the first connection 161 and the second connection 162. A longer-than-expected latency value may be an indication of a potential bottleneck.

Illustrative Implementations

Figure 7:
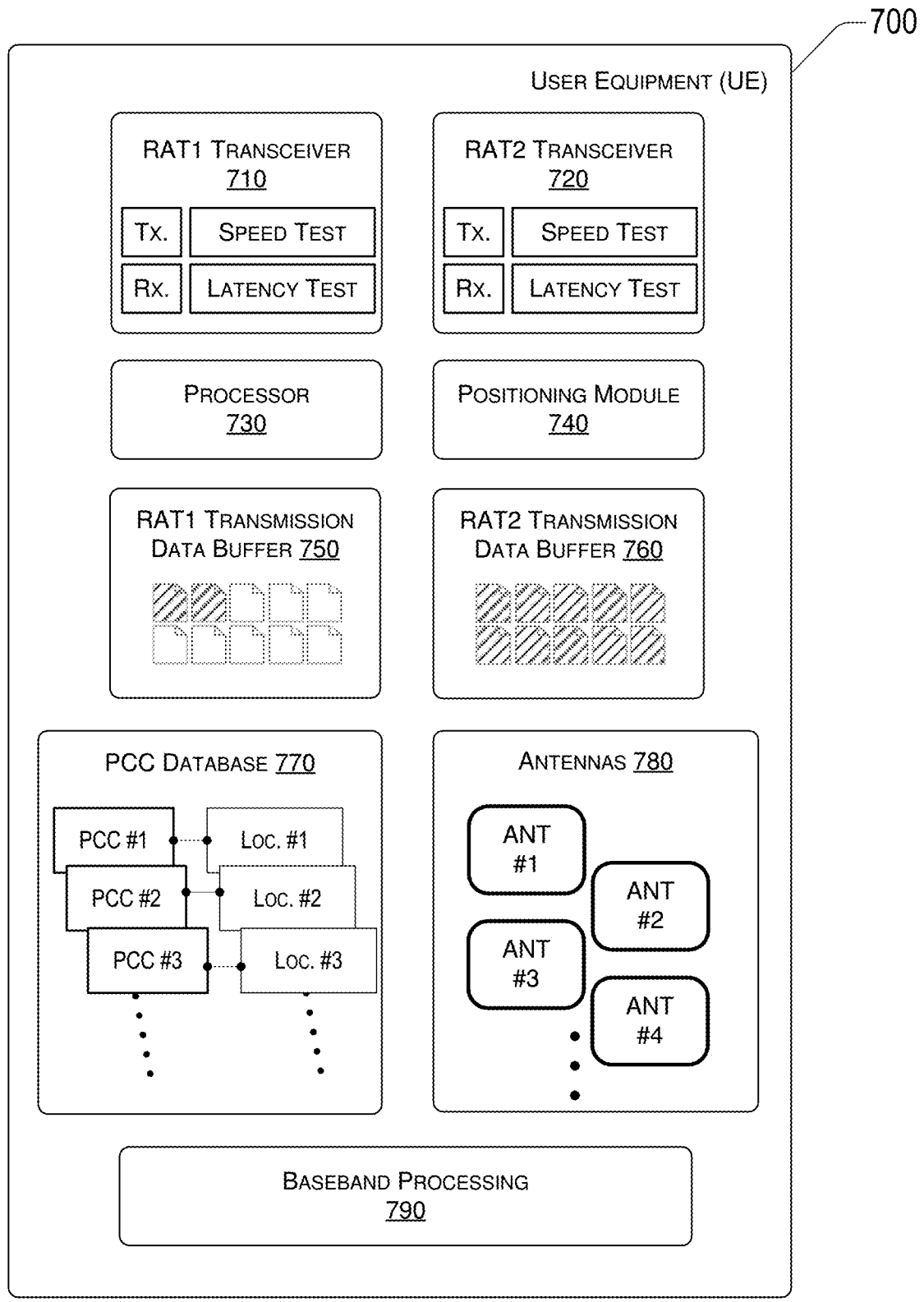
FIG. 7 is a block diagram of an example user equipment in accordance with an implementation of the present disclosure.

FIG. 7 illustrates an example apparatus 700 in accordance with an implementation of the present disclosure. Apparatus 700 may perform various functions to implement schemes, techniques, processes and methods described herein pertaining to enhancing communication performance by properly allocating antennas between connections using different RATs, including scenarios/schemes described above as well as process(es) described below.

Apparatus 700 may embody the UE 160 of FIGS. 1-4 and 6. Apparatus 700 may be a portable or mobile apparatus, a wearable apparatus, a wireless communication apparatus or a computing apparatus. For instance, apparatus 700 may be implemented in a smartphone, a smartwatch, a personal digital assistant, a digital camera, or a computing equipment such as a tablet computer, a laptop computer or a notebook computer. Apparatus 700 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 700 has several components or modules, including some components selected from a first transceiver 710, a second transceiver 720, a processor 730, a positioning module 740, a first transmission data buffer 750, a second transmission data buffer 760, a preferred connection configuration (PCC) database 770, a plurality of antennas 780, as well as a baseband processing module 790. Apparatus 700 may further include one or more other components not pertinent to the proposed scheme of the present disclosure (e.g., internal power supply, display device and/or user interface device), and, thus, such component(s) of apparatus 700 are neither shown in FIG. 7 nor described below in the interest of simplicity and brevity.

In some embodiments, some of the modules 710-790 as listed above are modules of software instructions being executed by one or more processing units (e.g., a processor) of a computing device or electronic apparatus. In some embodiments, some of the modules 710-790 are modules of hardware circuits implemented by one or more integrated circuits (ICs) of an electronic apparatus. Though the modules 710-790 are illustrated as being separate modules, some of the modules can be combined into a single module.

The first transceiver 710 may be configured to establish a first connection (e.g., the first connection 161) to a first network by employing a first RAT, whereas the second transceiver 720 may be configured to establish a second connection (e.g., the second connection 162) to a second network by employing a second RAT. The first network to which the first transceiver 710 is connected may be the network 110, and the second network to which the second transceiver 720 is connected may be the network 120. In some embodiments, the first network may be a cellular network or some other types of wide area network (WAN), whereas the second network may be a wireless local area network (WLAN). The first RAT may be 4G LTE or 5G NR, whereas the second RAT may be one of the IEEE 802.11 standards. The first connection may be a wireless connection between apparatus 700 and a base station of the first network, such as the base station 114. The first connection may be a wireless connection between apparatus 700 and a Wi-Fi router or access point of the second network, such as the Wi-Fi router 124.

Each of the first transceiver 710 and the second transceiver 720 may include a transmitter (Tx.) and a receiver (Rx.) for transmitting and receiving radio signals to the network 110 or 120 via the connection 161 or 162. Moreover, each of the first transceiver 710 and the second transceiver 720 may also include a speed test module and/or a latency test module for monitoring communication performance/matrices of the connections 161 and 162. The processor 730 may detect a precondition of changing a MIMO setting of the connections 161 and/or 162, e.g., a transmission bottleneck as described in the scheme 320, 610 or 620, based on the latency and/or speed matrices provided by the speed test module and/or the latency test module.

In one aspect, the processor 730 may be implemented in the form of one or more single-core processors, one or more multi-core processors, one or more RISC processors, or one or more CISC processors. That is, even though a singular term "a processor" is used herein to refer to the processor 730, the processor 730 may include multiple processors in some implementations and a single processor in other implementations in accordance with the present disclosure. In another aspect, the processor 730 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, the processor 730 is a special-purpose machine specifically designed, arranged and configured to perform specific tasks including enhancing communication performance by properly allocating antennas between connections using different RATs in accordance with various implementations of the present disclosure.

To this end, the processor 730 may be configured to perform an operation of detecting a precondition of changing a first MIMO setting of the first connection. The processor 730 may be configured to subsequently perform an operation of communicating to the first network, via the first connection, an intent to change the first MIMO setting of the first connection. For instance, the processor 730 may detect a precondition of changing a MIMO setting of the connection 161 as described elsewhere herein above. The processor 730 may further communicate to the cellular network 110 an intent to change the MIMO setting of the first connection. In some embodiments, the processor 730 may communicate the intent to a base station of the first network, such as the base station 114 of the cellular network 110, by sending a request of changing the MIMO setting of the connection 161 to the base station 114. The request may be part of the UE assistance information (UAI) that is specific to the apparatus 700. The request may be sent using the uplink (UL) of the connection 161.

The processor 730 may subsequently reconfigure the first connection by changing the first MIMO setting, and then reconfigure the second connection accordingly. For instance, in an event that the processor 730 detects a precondition that triggers an intent to reduce the MIMO number of the connection 161 from 4 to 2, the processor 730 may accordingly reconfigure the connection 161 so that two of the cellular antennas 211-214 are released or disengaged from servicing the connection 161. The processor 730 may subsequently reconfigure the connection 162 by increasing the MIMO number thereof from 2 to 4, which is realized by engaging the two released antennas with the transceiver 720 to service the connection 162. For instance, each of the two released antennas may be used to service an additional spatial stream of the connection 162.

In at least some embodiments, apparatus 700 may not reconfigure the connection 162 until a confirmation is received by the transceiver 710. The confirmation is sent from the base station 114 via the downlink (DL) of the connection 161, whereas the confirmation indicates that the request has been granted by the network 110, especially by the base station 114.

The positioning module 740 is configured to determine or otherwise detect an immediate geolocation of apparatus 700. In some embodiments, the positioning module 740 may provide the geolocation via a global positioning system (GPS). Alternatively, the positioning module 740 may provide the geolocation based on a mesh positioning system employing a plurality of sensors, transmitters or location beacons such as beacons 481-483 provided inside the house 470.

Each of the transmission data buffers 750 and 760 is configured to store data that is queued to be transmitted by the transceivers 710 and 720, respectively. For example, the transmission data buffer 750 may be used to buffer data that is to be transmitted by the transceiver 710 to the cellular network 110 via the uplink of the connection 161. Likewise, the transmission data buffer 760 may be used to buffer data that is to be transmitted by the transceiver 720 to the WLAN 120 via the uplink of the connection 162. The processor 730 may be configured to monitor the status of the transmission data buffers 750 and 760, based on which the processor 730 may detect a precondition that may trigger an intent to change a MIMO setting of either or both of the first connection 161 and the second connection 162, e.g. an occurrence of a transmission bottleneck in the first connection 161 and/or the second connection 162. For example, a full or nearly full transmission data buffer 750 may indicate that there is likely a transmission bottleneck in the connection 161, at least in the uplink thereof. The processor 730 may accordingly communicate to the network 110 an intent to change a MIMO setting of the connection 161 to relieve or otherwise mitigate the transmission bottleneck.

The PCC database 770 is configured to store a plurality of preferred connection configurations (PCCs), each of which governs certain communication parameter settings (e.g., a MIMO number) of the first and second connections 161 and 162. For instance, PCCs 461, 462 and 463 may be stored in the PCC database 770 in an event that the UE 160 of FIG. 4 is embodied by apparatus 700. As described elsewhere herein above, each entry stored in the PCC database 770 is specific to a geolocation of apparatus 700. Moreover, each entry of the PCC database 770 is a historical connection configuration that had been applied in the past to govern the connections 161 and 162 and resulted in a satisfactory, or even the best, communication performance in the past.

As described above, the positioning module 740 is configured to provide the immediate location of apparatus 700. Based on the immediate geolocation, the processor 730 is configured to examine the PCC database 770 to select a PCC entry therein that has a corresponding geolocation that is in a vicinity of the immediate location of apparatus 700. The processor 730 may then compare the selected entry with the connection configuration that is currently applied for the first and second connections 161 and 162. A difference between the current configuration and the selected configuration may constitute a precondition that triggers an intent to change the MIMO setting of the first connection 161 and/or the second connection 162, unless the current configuration results in a better communication performance than the selected configuration did. Should the current configuration result in an improved communication performance, the processor 730 may be configured to replace the selected entry with the current configuration in the PCC database 770.

The plurality of antennas 780 may include antennas that are able to receive radio signals encompassing the transmission bands of the first and second connections 161 and 162. The plurality of antennas 780 may embody the cellular antennas 211-214 as well as the Wi-Fi antennas 221 and 222. Moreover, the plurality of antennas 780 may further include antennas that can only be allocated to servicing either of the first connection 161 and the second connection 162, but not both of the first connection 161 and the second connection 162. The plurality of antennas 780 may further include other types of antennas that service various other wireless communications performed by apparatus 700, such as NFC, mmWave, BT, and GPS communications.

The baseband processing module 790 is configured to process data in the baseband and outside the transceivers 710 and 720. For instance, in a downlink, the radio signal received by the antennas 780 is processed by the transceivers 710 and 720 before being passed to the baseband processing module 790. In an uplink, the baseband data is processed by the baseband processing module 790 before being sent to the transceivers 710 and 720 for transmission. In some implementations, the baseband processing module 790 may include an analog-to-digital converter (ADC), a digital-to-analog converter (DAC), as well as digital processing circuitry.

Illustrative Processes

Figure 8:
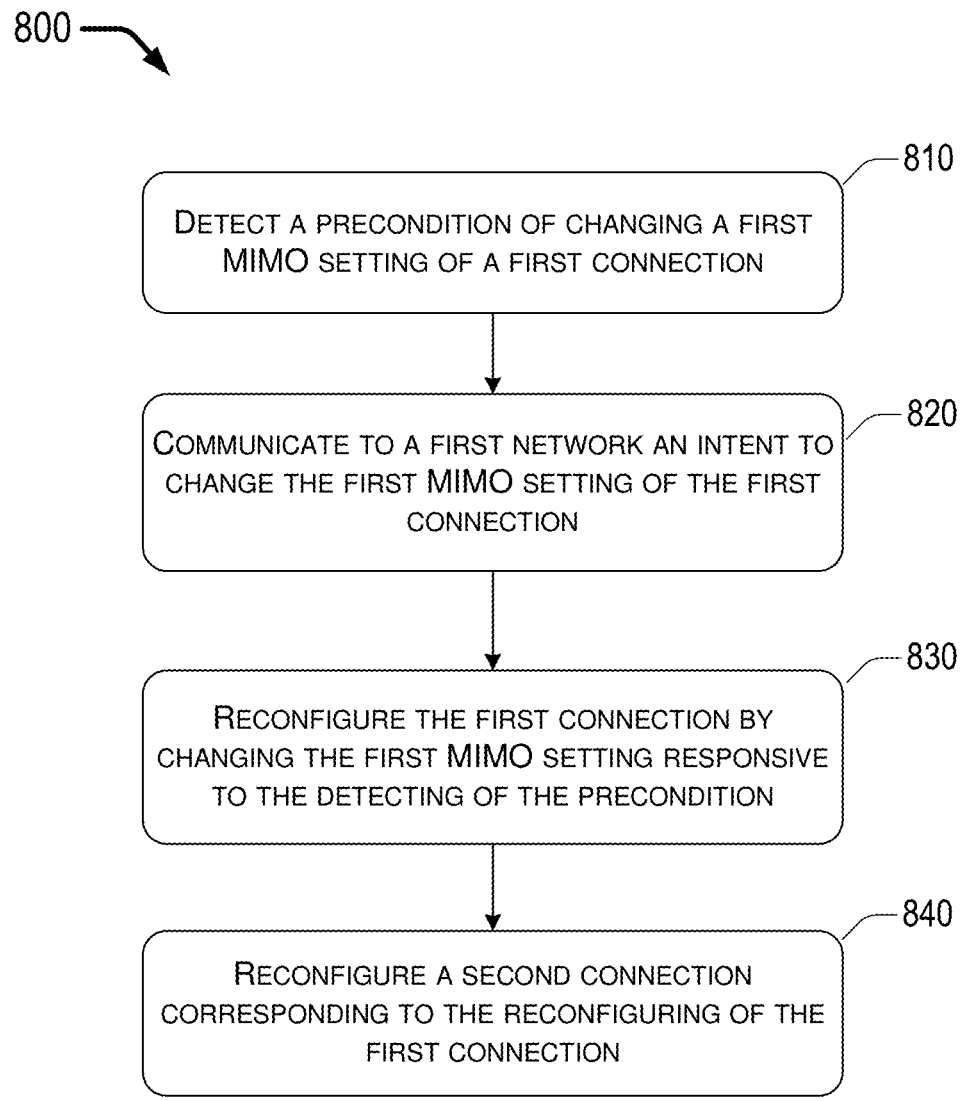
FIG. 8 is a flowchart of an example process in accordance with an implementation of the present disclosure.

FIG. 8 illustrates an example process 800 in accordance with an implementation of the present disclosure. Process 800 may be an example implementation of schemes described above whether partially or completely, with respect to enhancing communication performance by properly allocating antennas between connections using different RATs in accordance with the present disclosure. Process 800 may represent an aspect of implementation of features of apparatus 700. Process 800 may include one or more operations, actions, or functions as illustrated by blocks 810, 820, 830 and 840. Although illustrated as discrete blocks, various blocks of process 800 may be divided into additional blocks, combined into fewer blocks, or eliminated, depending on the desired implementation. Moreover, the blocks of process 800 may be executed in the order shown in FIG. 8 or, alternatively, in a different order. Furthermore, one or more of the blocks/sub-blocks of process 800 may be executed repeatedly or iteratively. Process 800 may be implemented by apparatus 700 as well as any variations thereof. Solely for illustrative purposes and without limitation, process 800 is described below in the context of apparatus 700 implemented as a UE having a first connection to a first network via a first RAT and a second connection to a second network via a second RAT. In some implementations, the first network may be a cellular network (e.g., the network 110) or a wide area network (WAN), whereas the second network may be a WLAN (e.g., the network 120). The first connection may be a wireless connection (e.g., the connection 161) between the UE and a base station (e.g., the base station 114) of the first network. The second connection may be a wireless connection (e.g., the connection 162) between the UE and a wireless router or access point (e.g., the wireless router 124) of the second network. Process 800 may begin at block 810.

At 810, process 800 may involve the processor 730 of apparatus 700 detecting a precondition of changing a first MIMO setting of the first connection. In some embodiments, a transmission bottleneck in either the first connection or the second connection may constitute the precondition. For instance, the processor 730 may monitor the status of the transmission data buffers 750 and 760 and detect a precondition of increasing the MIMO number of the first connection, as a transmission bottle neck has occurred or is likely to occur because the transmission data buffer 750 is full or nearly full. As another example, the processor 730 may detect another precondition of changing a first MIMO setting of the first connection, because the current connection configuration sets a MIMO number of the first connection higher than a preferred MIMO number suggested by the corresponding historical connection configuration stored in the PCC database 770. Process 800 may proceed from 810 to 820.

At 820, process 800 may involve the processor 730 communicating an intent to change the MIMO setting of the first connection, as triggered by the precondition detected at 810, to the first network, i.e., the network to which apparatus 700 is connected via the first RAT. For example, the UE 160 may communicate to the network 110 an intent to change the MIMO number of the first connection 161 by sending to the base station 114 a request of changing the MIMO number. In some embodiments, the request is sent to the base station 114 via UAI, which is specific to the UE 160. In some embodiments, after the request is sent, process 800 may involve the processor 730 further receiving a confirmation from the network 110 (e.g., from the base station 114), wherein the confirmation indicates that the request has been granted by the network 110 (i.e., by the base station 114). Process 800 may proceed from 820 to 830.

At 830, process 800 may involve the processor 730 reconfiguring the first connection by changing the first MIMO setting. In some embodiments, the first network may also be involved in the reconfiguring of the first connection. For example, as described elsewhere herein above, a handshaking procedure may be executed between the UE 160 and the base station 114 prior to the actual changing of the MIMO setting of the first connection. In some alternative implementations, the processor 730 may change the MIMO setting of the first connection prior to or even without receiving the confirmation from the base station 114, as described elsewhere herein above. Process 800 may proceed from 830 to 840.

At 840, process 800 may involve the processor 730 reconfiguring the second connection. The reconfiguration of the second connection at 840 corresponds to the reconfiguration of the first connection at 830.

In some implementations, the reconfiguration of the first connection may involve decreasing a first MIMO number of the first connection by a fixed number, an integer (e.g., reducing from 4 to 2), whereas the reconfiguration of the second connection may involve increasing a second MIMO number of the second connection by the same fixed number (e.g., increasing from 2 to 4 or from 1 to 3). The decreasing of the first MIMO number may result in releasing one or more antennas (e.g., the cellular antennas 213 and 214 as shown in the scheme 310) from servicing the first connection. Moreover, the increasing of the second MIMO number may result from employing the one or more antennas in the second connection.

In some implementations, the reconfiguration of the first connection may involve increasing a first MIMO number of the first connection by a fixed number, an integer (e.g., increasing from 2 to 4), whereas the reconfiguration of the second connection may involve decreasing a second MIMO number of the second connection by the same fixed number. The decreasing of the second MIMO number may result in releasing one or more antennas (e.g., the cellular antennas 213 and 214 as shown in the scheme 320) from servicing the second connection. Moreover, the increasing of the first MIMO number may result from employing the one or more antennas in the first connection.

In some alternative implementations, the reconfiguration of the second connection may involve decreasing a second MIMO number of the second connection by releasing one or more antennas from servicing the second connection. Meanwhile, the reconfiguration of the first connection may involve increasing a quantity of antennas for at least one spatial stream of the first connection without changing a first MIMO number of the first connection. For instance, apparatus 700 may additionally employs the one or more antennas that have been released to realize beamforming or maximum ratio combining (MRC) for at least one spatial stream of the first connection.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implementable in a user equipment (UE) having a first connection to a first network via a first radio access technology (RAT) and a second connection to a second network via a second RAT, the method comprising:
   detecting a precondition of changing a first multi-input-multi-output (MIMO) setting of the first connection;
   communicating to the first network an intent to change the first MIMO setting of the first connection;
   reconfiguring the first connection by changing the first MIMO setting responsive to the detecting; and
   reconfiguring the second connection corresponding to the reconfiguring of the first connection,
   wherein:
      the changing of the first MIMO setting comprises increasing a quantity of antennas for at least one spatial stream of the first connection without changing a first MIMO number of the first connection,
      the reconfiguring of the second connection comprises decreasing a second MIMO number of the second connection by releasing one or more antennas from servicing the second connection, and
      the reconfiguring of the first connection comprises the UE additionally employing the one or more antennas for the at least one spatial stream of the first connection.

2. The method of claim 1, wherein the UE employs the one or more antennas for beamforming or maximum ratio combining (MRC) for the first connection.

3. The method of claim 1, wherein the UE comprises a plurality of antennas comprising a first group comprising one or more antennas and a second group comprising one or more antennas, the first group configured to engage with the first transceiver to service the first connection, the second group configured to engage with the second transceiver to service the second connection, wherein the method further comprises performing either a first operation or a second operation, and wherein:
   the first operation comprises:
      changing the first MIMO setting by disengaging one or more antennas from the first group, and
      reconfiguring the second connection by engaging the one or more antennas disengaged from the first group into the second group, each of the one or more antennas engaged into the second group servicing an additional spatial stream of the second connection, and
   the second operation comprises:
      reconfiguring the second connection by disengaging one or more antennas from the second group, and
      changing the first MIMO setting by engaging the one or more antennas disengaged from the second group into the first group, each of the one or more antennas engaged into the first group servicing an additional spatial stream of the first connection.

4. The method of claim 1, wherein the precondition comprises a transmission bottleneck in either the first connection or the second connection, wherein each of the first and second transceivers comprises either or both of a speed test module and a latency test module, and wherein the method further comprises:
   detecting the transmission bottleneck based on test values provided by the speed test module or the latency test module of the first or second transceiver.

5. The method of claim 1, wherein the UE comprises a first transmission data buffer for the first connection and a second transmission data buffer for the second connection, wherein the precondition comprises a transmission bottleneck in either the first connection or the second connection, and wherein the method further comprises:
   detecting the transmission bottleneck based on a status of the first transmission data buffer or a status of the second transmission data buffer.

6. The method of claim 1, wherein the UE comprises a preferred connection configuration (PCC) database comprising a plurality of PCCs each being a historical connection configuration and corresponding to a geolocation, and wherein the method further comprises:
   detecting the precondition by comparing a current connection configuration of the first and second connections with a PPC selected from the plurality of PCCs, and
   selecting the PCC at least based on a geolocation of the UE.

7. The method of claim 1, further comprising:
   detecting, by a positioning module of the UE, the geolocation of the UE.

8. A method implementable in a user equipment (UE) having a first connection to a first network via a first radio access technology (RAT) and a second connection to a second network via a second RAT, the method comprising:
   detecting a precondition of changing a first multi-input-multi-output (MIMO) setting of the first connection;
   communicating to the first network an intent to change the first MIMO setting of the first connection;
   reconfiguring the first connection by changing the first MIMO setting responsive to the detecting; and
   reconfiguring the second connection corresponding to the reconfiguring of the first connection,
   wherein the detecting of the precondition:
      retrieving a historical connection configuration at least based on a geolocation of the UE; and
      comparing the historical connection configuration and a current connection configuration of the UE.

9. The method of claim 8, wherein the UE comprises a plurality of antennas comprising a first group comprising one or more antennas and a second group comprising one or more antennas, the first group configured to engage with the first transceiver to service the first connection, the second group configured to engage with the second transceiver to service the second connection, wherein the method further comprises either a first operation or a second operation, and wherein:
the first operation comprises:
changing the first MIMO setting by disengaging one or more antennas from the first group, and
reconfiguring the second connection by engaging the one or more antennas disengaged from the first group into the second group, each of the one or more antennas engaged into the second group servicing an additional spatial stream of the second connection, and
the second operation comprises:
reconfiguring the second connection by disengaging one or more antennas from the second group, and
changing the first MIMO setting by engaging the one or more antennas disengaged from the second group into the first group, each of the one or more antennas engaged into the first group servicing an additional spatial stream of the first connection.

10. The method of claim 8, wherein the precondition comprises a transmission bottleneck in either the first connection or the second connection, wherein each of the first and second transceivers comprises either or both of a speed test module and a latency test module, and wherein the method further comprises:
detecting the transmission bottleneck based on test values provided by the speed test module or the latency test module of the first or second transceiver.

11. The method of claim 8, wherein the UE comprises a first transmission data buffer for the first connection and a second transmission data buffer for the second connection, wherein the precondition comprises a transmission bottleneck in either the first connection or the second connection, and wherein the method further comprises:
detecting the transmission bottleneck based on a status of the first transmission data buffer or a status of the second transmission data buffer.

12. The method of claim 8, wherein the UE comprises a preferred connection configuration (PCC) database comprising a plurality of PCCs each being a historical connection configuration and corresponding to a geolocation, and wherein the method further comprises:
detecting the precondition by comparing a current connection configuration of the first and second connections with a PPC selected from the plurality of PCCs, and
selecting the PCC at least based on a geolocation of the UE.

13. The method of claim 8, further comprising: detecting, by a positioning module of the UE, the geolocation of the UE.

14. An apparatus, comprising:
a first transceiver configured to establish a first connection to a first network via a first radio access technology (RAT);
a second transceiver configured to establish a second connection to a second network via a second RAT;
a plurality of antennas comprising a first group comprising one or more antennas and a second group comprising one or more antennas, the first group configured to engage with the first transceiver to service the first connection, the second group configured to engage with the second transceiver to service the second connection; and
a processor configured to perform operations comprising:
detecting a precondition of changing a first multi-input-multi-output (MIMO) setting of the first connection;
communicating, to the first network via the first transceiver, an intent to change the first MIMO setting of the first connection;
reconfiguring the first connection by changing the first MIMO setting responsive to the detecting;
reconfiguring the second connection corresponding to the reconfiguring of the first connection; and
performing either a first operation or a second operation,
wherein the first operation comprises:
changing the first MIMO setting by disengaging one or more antennas from the first group, and
reconfiguring the second connection by engaging the one or more antennas disengaged from the first group into the second group, each of the one or more antennas engaged into the second group servicing an additional spatial stream of the second connection, and
wherein the second operation comprises:
reconfiguring the second connection by disengaging one or more antennas from the second group, and
changing the first MIMO setting by engaging the one or more antennas disengaged from the second group into the first group, each of the one or more antennas engaged into the first group servicing an additional spatial stream of the first connection.

15. The apparatus of claim 14, wherein:
the changing of the first MIMO setting comprises increasing a quantity of antennas for at least one spatial stream of the first connection without changing a first MIMO number of the first connection,
the reconfiguring of the second connection comprises decreasing a second MIMO number of the second connection by releasing one or more antennas from servicing the second connection, and
the reconfiguring of the first connection comprises the UE additionally employing the one or more antennas for the at least one spatial stream of the first connection.

16. The apparatus of claim 14, wherein the detecting of the precondition comprises:
retrieving a historical connection configuration at least based on a geolocation of the apparatus; and
comparing the historical connection configuration and a current connection configuration of the apparatus.

17. The apparatus of claim 14, wherein:
the precondition comprises a transmission bottleneck in either the first connection or the second connection,
each of the first and second transceivers comprises either or both of a speed test module and a latency test module, and
the processor is configured to detect the transmission bottleneck based on test values provided by the speed test module or the latency test module of the first or second transceiver.

18. The apparatus of claim 14, further comprising:
a first transmission data buffer for the first connection; and
a second transmission data buffer for the second connection, wherein:
the precondition comprises a transmission bottleneck in either the first connection or the second connection, and
the processor is configured to detect the transmission bottleneck based on a status of the first transmission data buffer or a status of the second transmission data buffer.

19. The apparatus of claim 14, further comprising:
a preferred connection configuration (PCC) database comprising a plurality of PCCs each being a historical connection configuration and corresponding to a geolocation, wherein:
the processor is configured to detect the precondition by comparing a current connection configuration of the first and second connections with a PPC selected from the plurality of PCCs, and
the processor is further configured to select the PCC at least based on a geolocation of the apparatus.

20. The apparatus of claim 19, further comprising:
a positioning module configured to detect the geolocation of the apparatus.

* * * * *